Patented Mar. 2, 1937

2,072,475

UNITED STATES PATENT OFFICE 2,072,475

MANUFACTURE OF WETTING, PENETRATING, FROTHING, AND WASHING AGENTS

Rudolf Kern, Oschatz, Germany, assignor to firm: Chemische Fabrik R. Baumheier Aktiengesellschaft, Zschollau, Germany No Drawing. Application September 20, 1932, Serial No. 634,079. In Germany September 29, 1931

20 Claims. (Cl. 260—106)

This invention relates to the manufacture of wetting, penetrating, frothing and washing agents.

In my copending application Serial Number 555,147, filed August 4, 1931, now Patent No. 1,980,342, dated November 13, 1934, I have described a process for making highly sulfonated and condensed derivatives of fatty acids, which consists in treating fatty acids or their derivatives with sulfuric acid, in which at least one hydrogen atom is substituted by an organic group, and subsequently with condensing agents, which also may be sulfonating agents, such as chlorosulfonic acid and the like.

The present invention is an improvement of the process of my copending application and has for its main object, to replace the fatty acids or their derivatives used as starting material in the process of my copending application wholly or partially by higher aliphatic alcohols, thus obtaining better frothing products with higher wetting power, which are at least as stable against electrolytes as the products claimed in my copending application.

According to my invention higher aliphatic alcohols or substances or mixtures containing the same are first treated with sulfuric acid, in which at least one hydrogen atom is replaced by an organic group, and subsequently with one or more condensing agents, which may be sulfonating agents or not, such as fuming sulfuric acid, chlorosulfonic acid, aluminium chloride, phosphorus pentachloride and the like.

The organic groups or radicles which may be substituted for a hydrogen atom in the sulfuric acid are the following: alkyl, aryl, aralkyl, and acyl groups, and their substitutes.

Examples (1) 70 parts of di-methyl sulfate are mixed with 70 parts of oleyl alcohol and stirred with 100 parts of fuming sulfuric acid with 20% of $SO_3$. The product obtained, which is readily water soluble under formation of froth, is freed from the excess of sulfuric acid and neutralized. It is a good wetting agent. The wetting power is much greater than that of a product obtained by treatment of the same alcohol with fuming sulfuric acid alone. The height of froth formed with the great as that of a product obtained by treatment great than that of a product obtained by treatment of the same alcohol with fuming sulfuric acid alone. The recovery of the sulfonated product from the reaction mixture does not involve difficulties, as it is not as easily decomposed as the sulfonated product obtained with sulfuric acid alone.

(2) 30 parts of a mixture of cetyl alcohol and oleyl alcohol are mixed with 20 parts of cresol sulfonic acid and 2 parts of aluminium chloride. The mixture is stirred with 40 parts of chlorosulfonic acid at room temperature. The reaction mixture is worked up in the same manner as described above. A paste is obtained, which may be used with advantage for washing sensitive fibres.

Instead of cresol sulfonic acid the sulfuric acid ester of salicylic acid may be employed.

(3) 154 parts of butyl sulfuric acid are introduced into 242 parts of molten cetyl alcohol. The mixture is treated at about 40 to 50° C. with 100 parts of fuming sulfuric acid with 25% of $SO_3$, until the product is easily water soluble at raised temperatures. After 12 hours standing the reaction mixture is poured upon ice and the excess of sulfuric acid is removed. The product is neutralized and a yellowish white paste with a peculiar odor is obtained, which is clear, soluble in water and stable against acids and salts.

(4) To 117 parts of chloro-phenol dissolved in 75 parts of carbon tetrachloride are added while cooling 105 parts of chloro-sulfonic acid, thus obtaining a solution of p-chloro-phenyl sulfonic acid. The reaction takes place momentarily under violent formation of hydrogen chloride. 117 parts of oleyl alcohol and then 21 parts of aluminium chloride are added to the reaction product while stirring at room or raised temperature. Strong disengagement of hydrogen chloride takes place. The mass which was very viscous before becomes more liquid and is washed, to remove aluminium salts, and neutralized. The product obtained is stable, forms excellent froth and has a high wetting power.

(5) 124 parts of acetyl sulfuric acid are mixed at 30° with 71 parts of the semi-liquid fraction of technical cetyl alcohol. 20 parts of phosphorus pentachloride are added to the mixture, while slowly stirring. Strong disengagement of hydrogen chloride is noticed. The reaction product is thinly liquid and easily water soluble. It resembles more the sulfonate of castor oil than that of aliphatic alcohols, obtained with sulfuric acid alone, as the latter sulfonates are generally only soluble in warm water. It froths better and is more stable against electrolytes than the normal sulfonates of aliphatic alcohols.

I claim:

1. A method for making agents of the character described, which consists in treating higher monohydric aliphatic alcohols with sulfuric acid, in which at least one hydrogen atom is substituted by an organic radicle, and subsequently with condensing agents, said radicle being selected from a group consisting of alkyl, aryl, aralkyl, hydroaryl, and acyl groups.

2. A method for making agents of the character described, which consists in treating sulfonable substances containing higher monohydric aliphatic alcohols with sulfuric acid, in which at least one hydrogen atom is substituted by an organic radicle and subsequently with condensing agents, said radicle being selected from a group consisting of alkyl, aryl, aralkyl, hydroaryl, and acyl groups.

3. A method for making agents of the character described, which consists in treating mixtures of sulfonable substances with higher monohydric aliphatic alcohols with sulfuric acid, in which at least one hydrogen atom is substituted by an organic radicle and subsequently with condensing agents, said radicle being selected from a group consisting of alkyl, aryl, aralkyl, hydroaryl, and acyl groups.

4. A method for making agents of the character described, which consists in treating higher monohydric aliphatic alcohols with sulfuric acid, in which at least one hydrogen atom is substituted by an organic radicle, and subsequently with sulfonating condensing agents, said radicle being selected from a group consisting of alkyl, aryl, aralkyl, hydroaryl, and acyl groups.

5. An agent of the character described consisting of the reaction product of higher monohydric aliphatic alcohols with sulfuric acid, in which at least one hydrogen atom is replaced by an organic radicle, and subsequently with at least one condensing agent, said radicle being selected from a group consisting of alkyl, aryl, aralkyl, hydroaryl, and acyl groups.

6. An agent of the character described consisting of the reaction product of sulfonable substances containing higher monohydric aliphatic alcohols with sulfuric acid, in which at least one hydrogen atom is replaced by an organic radicle, and subsequently with at least one condensing agent, said radicle being selected from a group consisting of alkyl, aryl, aralkyl, hydroaryl, and acyl groups.

7. An agent of the character described consisting of the reaction product of mixtures of sulfonable substances with higher monohydric aliphatic alcohols with sulfuric acid, in which at least one hydrogen atom is replaced by an organic radicle, and subsequently with at least one condensing agent, said radicle being selected from a group consisting of alkyl, aryl, aralkyl, hydroaryl, and acyl groups.

8. An agent of the character described consisting of the reaction product of higher monohydric aliphatic alcohols with sulfuric acid, in which at least one hydrogen atom is replaced by an organic radicle, and subsequently with at least one condensing agent, having sulfonating properties, said radicle being selected from a group consisting of alkyl, aryl, aralkyl, hydroaryl, and acyl groups.

9. A new composition of matter containing mainly a neutralized pasty mass of the composition cetyl oleyl cresyl ether sulfonic acid.

10. A new composition of matter containing mainly a neutralized pasty mass, soluble in water and stable against acids and salts, of the composition sulfonated cetyl butyl ether.

11. A new composition of matter containing mainly water soluble sulfo cetyl acetate substance which is stable against electrolytes.

12. As a new composition of matter, the neutralized reaction product of a higher monohydric aliphatic alcohol with a dialkyl sulfate and a condensing agent.

13. As a new composition of matter, the neutralized reaction product of a higher monohydric aliphatic alcohol, a condensing agent and sulfuric acid having at least one hydrogen atom substituted by an organic radicle selected from alkyl, aryl, aralkyl, hydroaryl, and acyl groups.

14. A method for making agents of the character described, comprising reacting a higher monohydric aliphatic alcohol with a dialkyl sulfate and fuming sulfuric acid, freeing the reaction product from excess sulfuric acid, and neutralizing.

15. A method for making agents of the character described, comprising reacting a higher monohydric aliphatic alcohol with an organic radicle substituted sulfuric acid and aluminum chloride, and washing and neutralizing the products, the radicle being selected from a group consisting of alkyl, aryl, aralkyl, hydroaryl, and acyl groups.

16. A method for making agents of the character described, comprising reacting a higher monohydric aliphatic alcohol with an organic radicle substituted sulfuric acid and fuming sulfuric acid, and washing and neutralizing the product, the radicle being selected from a group consisting of alkyl, aryl, aralkyl, hydroaryl, and acyl groups.

17. A new composition of matter containing mainly a substance selected from the sulfonated ether group consisting of sulfonated oleyl methyl ether, cetyl oleyl cresyl ether sulfonic acid, sulfonated cetyl butyl ether, and oleyl chlorophenyl ether sulfonic acid.

18. The process for making an agent of the character described which comprises treating a mixture of oleyl alcohol, cetyl alcohol, cresyl sulfonic acid, and aluminum chloride, with chlorosulfonic acid at room temperature and recovering the sulfonated product from the reaction.

19. The process for making an agent of the character described which comprises treating a mixture of butyl sulfuric acid and molten cetyl alcohol at about 40 to 50° C. with fuming sulfuric acid having 25% of $SO_3$, and recovering the sulfonated product from the reaction.

20. The process for making an agent of the character described which comprises treating a mixture of acetyl sulfuric acid and the semi-liquid fraction of technical cetyl alcohol with phosphorus pentachloride, and recovering the sulfonated product from the reaction.

RUDOLF KERN.